United States Patent
Wagh et al.

(10) Patent No.: US 6,518,212 B1
(45) Date of Patent: Feb. 11, 2003

(54) CHEMICALLY BONDED PHOSPHO-SILICATE CERAMICS

(75) Inventors: Arun S. Wagh, Orland Park, IL (US); Seung Y. Jeong, Westmont, IL (US); Dirk Lohan, Chicago, IL (US); Anne Elizabeth, Chicago, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 09/664,490

(22) Filed: Sep. 18, 2000

(51) Int. Cl.$^7$ .............................................. C04B 35/447
(52) U.S. Cl. ...................................................... 501/111
(58) Field of Search .......................... 501/111; 106/600, 106/690, 691

(56) References Cited

U.S. PATENT DOCUMENTS

| | | | |
|---|---|---|---|
| 2,687,967 A | | 8/1954 | Eileen et al. |
| 3,078,186 A | | 2/1963 | Tierney |
| 3,821,006 A | | 6/1974 | Schwartz |
| 3,960,580 A | | 6/1976 | Stierli et al. ................... 106/58 |
| 4,036,655 A | * | 7/1977 | Yamada et al. |
| 4,066,471 A | | 1/1978 | Burke ......................... 106/104 |
| 4,375,516 A | * | 3/1983 | Barall ........................... 501/84 |
| 4,504,555 A | | 3/1985 | William et al. |
| 4,792,359 A | * | 12/1988 | Barall et al. ................. 264/333 |
| 4,872,912 A | * | 10/1989 | Barall et al. ................. 264/333 |
| 4,956,321 A | | 9/1990 | Barrall ......................... 501/146 |
| RE33,366 E | * | 10/1990 | Barall ........................... 501/84 |
| 4,978,642 A | * | 12/1990 | Barall ........................... 501/84 |
| 5,002,610 A | | 3/1991 | Sherif et al. ................. 106/691 |
| 5,518,541 A | | 5/1996 | Fogel et al. ................. 106/691 |
| 5,645,518 A | | 7/1997 | Arun et al. |
| 5,718,757 A | | 2/1998 | Guillou et al. .............. 106/691 |

FOREIGN PATENT DOCUMENTS

| | | | |
|---|---|---|---|
| BR | 9405303 | | 9/1995 |
| DE | 3831106 A | | 3/1990 |
| EP | 0203485 | | 12/1986 |
| EP | 0661242 | | 12/1994 |
| EP | 0691314 | | 1/1996 |
| FR | 2714668 | | 7/1995 |
| FR | 2742142 | | 6/1997 |
| JP | 53120727 | * | 10/1978 |
| JP | 53120728 | * | 10/1978 |
| JP | 53126013 | * | 11/1978 |
| JP | 53126014 | * | 11/1978 |
| JP | 53126021 | * | 11/1978 |
| JP | 53126022 | * | 11/1978 |
| JP | 53133223 | * | 11/1978 |
| JP | 53139623 | * | 12/1978 |
| JP | 53139626 | * | 12/1978 |
| KR | 9507711 | * | 7/1995 |
| WO | 9635647 | | 11/1996 |
| WO | 9721639 | | 6/1997 |
| WO | 9856732 | | 12/1998 |
| WO | 0024690 | | 5/2000 |

OTHER PUBLICATIONS

Semler, Charles "A Quick–Setting Wollastonite Phosphate Cement" Ceramic Bulletin vol. 55, No. 11 (1976).

Sugama and Allan "Calcium Phosphate Cements Prepared by Acid–Base Reaction" J. Am. Ceram. Soc. (Aug. 1992).

Fukase et al. "Setting Reactions and Compressive Strengths of Calcium Phosphate Cements" J. Dent. Res. vol. 69 No. No. 12 (Dec. 1990).

Brown and Chow "A New Calcium Phosphate, Water–Setting Cement" pp. 352–379 (1986).

C.E. Semler "A Quick–Setting Wollastonite Phosphate Cement" American Ceramic Society Bulletin, vol. 55, No. 11, (No Date Available).

\* cited by examiner

*Primary Examiner*—Paul Marcantoni
(74) *Attorney, Agent, or Firm*—Orum & Roth

(57) ABSTRACT

A chemically bonded phospho-silicate ceramic formed by chemically reacting a monovalent alkali metal phosphate (or ammonium hydrogen phosphate) and a sparsely soluble oxide, with a sparsely soluble silicate in an aqueous solution. The monovalent alkali metal phosphate (or ammonium hydrogen phosphate) and sparsely soluble oxide are both in powder form and combined in a stochiometric molar ratio range of (0.5–1.5):1 to form a binder powder. Similarly, the sparsely soluble silicate is also in powder form and mixed with the binder powder to form a mixture. Water is added to the mixture to form a slurry. The water comprises 50% by weight of the powder mixture in said slurry. The slurry is allowed to harden. The resulting chemically bonded phospho-silicate ceramic exhibits high flexural strength, high compression strength, low porosity and permeability to water, has a definable and bio-compatible chemical composition, and is readily and easily colored to almost any desired shade or hue.

26 Claims, 2 Drawing Sheets

CHEMICALLY BONDED PHOSPHO-SILICATE CERAMICS

The United States Government has rights in this invention pursuant to Contract No. W-31-109-ENG-38 between the U.S. Department of Energy and University of Chicago operators of Argonne National Laboratory.

BACKGROUND OF THE INVENTION

1. Field of the Invention

The present invention relates to ceramics, and more particularly to a chemically bonded phospho-silicate ceramic that exhibits high flexural strength, high compression strength, low porosity and permeability to water, sets rapidly at room temperature, has a definable and bio-compatible chemical composition, is easily colored, and a method of producing the same.

2. Description of the Related Art

There is an acute need for a rapid setting pore-free high strength binding material for use in the construction and waste management industries. Traditional cements and ceramics used in these industries have many drawbacks that make those traditional materials less than ideal. For example, traditional cement, such as Portland cement, lacks fracture toughness, is extremely porous and permeable to water, and is very slow in setting. The open porosity of these traditional cement materials makes these materials susceptible to deterioration during the freezing and thawing which occurs in many climates across the United States, Europe and beyond. The expansion and contraction of water within the open pores of these traditional cement materials causes them to break down as they are exposed to extreme temperature fluctuations. Additionally, traditional cements, such as Portland cement, are slow in setting, requiring continuous hydration and attention until the cement material has been properly set, thus adding considerable labor costs to any given project.

The open porosity and thus high water permeability of traditional cement materials also limits the practical use of these materials in waste management and waste encapsulation projects. Highly porous cements are permeable to ground water and allow wastes and toxins to leach out from the encapsulated cement material.

Slightly soluble silicate minerals such as Wollastenite ($CaSiO_3$) and serpentinite ($Mg_6Si_4O_{10}(OH)_8$), have been used to develop phosphate cements. These phosphate cements are produced by using phosphoric acid, partially neutralized with zinc and aluminum, and then reacted with Wollastenite or serpentine. In spite of the neutralization step, the acid solutions are highly acidic, making them hard to transport to a construction site as a raw material and requiring rigorous safety training for employees in the construction industry, who are used to just adding water to powdered cement. Additionally, the high acidity of these phosphate cements corrodes conventional construction and concrete equipment.

Ceramics are typically less porous than traditional cement, however, traditional ceramics must be fired at extremely high temperatures in order to solidify and cure the ceramic material for practical use. Fired ceramic construction products are expensive, especially if there are large size components. The firing process is not suitable for waste management purposes because waste components volatilize during firing. Resins and other polymer products used as binding materials also provide a less porous product than traditional ceramic materials, however resins are typically expensive to manufacture, their fumes are toxic, and resulting resin products are flammable.

One ceramic material that has had some success as a binding material is the ceramicrete binder. Ceramicrete binders disclosed in our U.S. Pat. Nos. 5,645,518; 5,830,815 and 5,846,894, include compounds such as magnesium potassium phosphate ($MgKPO_4.6H_2O$) and newberyite ($MgHPO_4.3H_2O$) ceramics. These ceramicrete binders are considerably less porous than conventional cements, are not toxic or flammable, set at a controllable rate, and are a low cost alternative to polymer resins. These ceramicrete binders provide a compression strength comparable to the compression strength exhibited by Portland cement.

It is also known to combine ash with ceramicrete binders, as disclosed in our U.S. Pat. No. 5,830,815, to increase the compression strength to a level two to three times that of the compression strength of Portland cement, The porosity of the ceramicrete ash product is quite low reducing its susceptibility to freeze thaw deterioration and increasing its practical usefulness as a suitable waste encapsulation material that resists permeation of ground water and the leaching of wastes out of the encapsulated ceramicrete ash product. The ceramicrete ash product, however, is not often suitable for architectural uses where many true and subtle colors and shades are desired because the ash product cannot be easily dyed or colored. The ceramicrete ash product is gray or beige depending upon whether fly ash or bottom ash is used. This gray or beige starting color prevents many common architectural colors such as red, yellow, blue, etc., from being achieved, regardless of how much dye or pigment is added to the ash-containing product. Additionally, ash is a mixture of many oxides and silicates and may contain components that are not bio-compatible.

The lack of bio-compatibility in ash containing products, limits the use of those products in the bio-material industries which also have a great need for rapid setting, pore free, high strength binding materials which are also bio-compatible. Only bio-compatible components can make up the binding materials used in dentistry and orthopedics etc. For example, zinc phosphate cements have been used as dental cements because they are dense, hard and also bio-compatible. Zinc phosphate cements, however, are expensive to manufacture and set rapidly, within minutes, making them difficult to work with and produce in any sort of large quantity. For these reasons zinc phosphate cements are not practical for use in construction or waste encapsulation projects as well. Zinc phosphate cements also do not contain calcium phosphates or hydroxyapatite, which are desirable elements for bone tissue growth.

None of the previous binding materials provide a high strength, low porosity, rapid setting, easily colored, bio-compatible chemical composition needed for use in the construction, waste-management, and bio-material industries.

BRIEF SUMMARY OF THE INVENTION

An object of the present invention is to provide a chemically bonded phospho-silicate ceramic that exhibits high flexural and compression strength. The high strength phospho-silicate ceramic of the present invention can reduce the size of load-bearing structures in the construction industry, provide very strong waste encapsuation matrix and provide a high strength biomaterial for use in prosthetics and dentistry.

Another object of the present invention is to provide the new chemically bonded phospho-silicate ceramic exhibiting low porosity and permeability to water, providing a desirable construction material that is resistant to freeze-thaw deterioration during temperature fluctuations, as well as providing an excellent material for waste encapsulation that is resistant to permeation of ground water and leaching from the encapsulation material.

It is another object of the present invention to provide a phospho-silicate ceramic that sets rapidly at room temperature, without the continuous hydration and attention required by traditional cement materials, thus reducing labor costs. Additionally, the low temperature manufacture of the present invention makes the ceramic suitable for the construction, waste management and bio-material industries.

It is another object of the present invention to provide a new chemically bonded phospho-silicate ceramic made from non-toxic, readily available, easily transportable and inexpensive compounds.

It is another object of the present invention to provide a phospho-silicate ceramic having a definite and definable chemical composition, suitable in the bio-material industry where the chemical components must be known to ensure their bio-compatibility before introduction into the human body.

It is yet another object of the present invention to provide a phospho-silicate ceramic that is easily and readily colored to true colors in any variety of shades or hues.

It is yet another object of the present invention to provide a kit for the simple and easy manufacture of the new chemically bonded phospho-silicate ceramic at an industrial site or for home use.

Yet another object of the present invention is to provide a simple and quick method for manufacturing the new chemically bonded phospho-silicate ceramic of the present invention.

According to one aspect of the present invention, the above objects are realized in a phospho-silicate ceramic formed by chemically reacting a monovalent alkali metal phosphate and a sparsely soluble oxide, with a sparsely soluble silicate in an aqueous solution. The preferred sparsely soluble oxide is magnesium oxide, and the preferred sparsely soluble silicate is calcium silicate.

In one embodiment, the monovalent alkali metal phosphate, the sparsely soluble oxide and the sparsely soluble silicate are all in powder form and are combined to form a mixture. The mixture is comprised of 60% sparsely soluble silicate.

According to one aspect of the invention, the above objects are realized in a method of producing a phospho-silicate ceramic comprising the steps of (a) combining a monovalent alkali metal phosphate powder with a sparsely soluble oxide powder in a stochiometric molar ratio of 1:1 to form a binder powder; (b) adding a sparsely soluble silicate powder in a range of 1–80% by weight to the binder powder, to form a mixture;

DETAILED DESCRIPTION OF THE INVENTION

Figure 1:
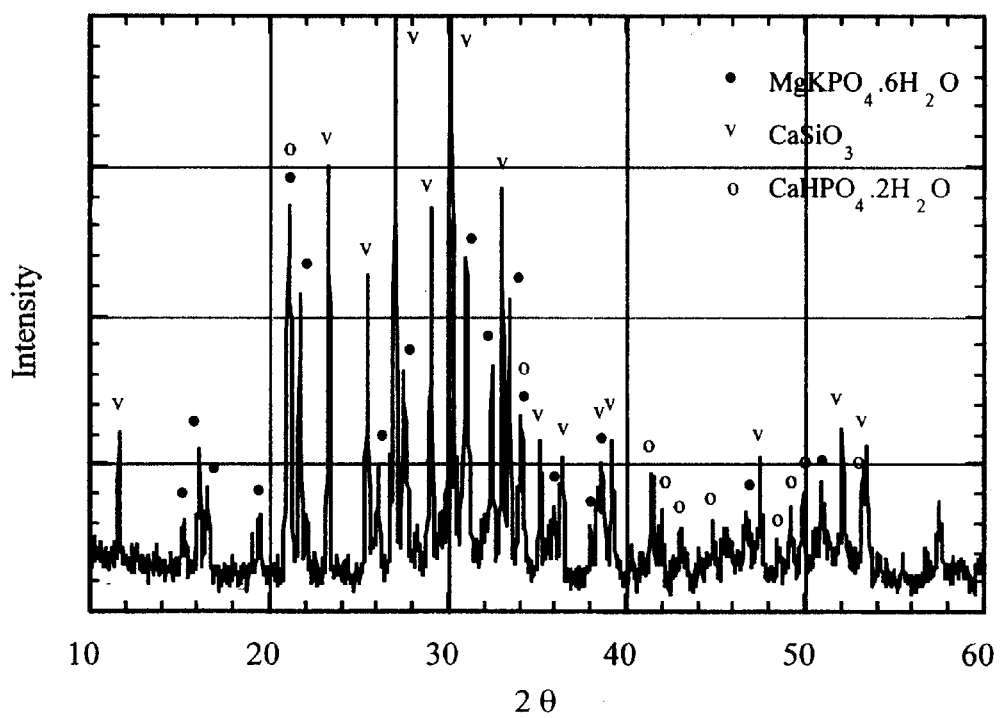
FIG. 1 is an X-ray diffraction pattern of phospho-silicate ceramic of Example 1.

The present invention teaches a new chemically bonded phospho-silicate ceramic that will benefit the construction, waste management, and biomaterial industries, as well as a method for producing the new chemically bonded phospho-silicate ceramic. The phospho-silicate ceramic of the present invention exhibits high flexural strength, high compression strength, low porosity and permeability to water, has a definable and bio-compatible chemical composition and is readily and easily colored to almost any desired shade or hue. The phospho-silicate ceramic of the present invention is simply manufactured in large or small quantities, sets rapidly at room temperatures in only a few hours, and continues to cure over a period of time, The phospho-silicate ceramic of the present invention can also be easily made on site away from the manufacturing plant as its separate components are very safely and easily transportable.

The phospho-silicate ceramic of the present invention is formed by chemically reacting a monovalent alkali metal phosphate and a sparsely soluble divalent oxide, with a sparsely soluble silicate in an aqueous solution. The phospho-silicate ceramic of the present invention can alternatively be formed by replacing the monovalent alkali metal phosphate with ammonium hydrogen phosphate, aluminum hydrophosphate or a phosphoric acid solution. The monovalent alkali metal phosphate (or ammonium hydrogen phosphate, aluminum hydrophosphate or phosphoric acid solution) and sparsely soluble oxide form a ceramicrete binder as disclosed in our earlier patents, namely U.S. Pat. Nos. 5,645,518, 5,830,815 and 5,846,894, incorporated herein by reference. U.S. Pat. Nos. 5,645,518, 5,830,815 and 5,846,894, disclose ceramicrete binders such as magnesium potassium phosphate ($MgKPO_4 \cdot 6H_2O$) and newberylite ($MgHPO_4 \cdot 3H_2O$), etc. Ceramicrete binders are inexpensive to manufacture in large scale, because their components are widely available and generally inexpensive.

Monovalent alkali metal phosphates suitable for forming ceramicrete binders include dihydrogen phosphates of all Group 1A elements in the periodic table and suitable ammonium hydrogen phosphates include, ammonium dihydrogen phosphate (($NH_4$)$H_2PO_4$) and diammonium hydrogen phosphate (($NH_4$)$_2HPO_4$). Sodium dihydrogen phosphate ($NaH_2PO_4$); lithium dihydrogen phosphate ($LiH_2PO_4$); and potassium dihydrogen phosphate ($KH_2PO_4$) are preferable monovalent alkali metals for forming the ceramicrete binders. In addition, aluminum dihydrogen phosphate may also be used.

Suitable sparsely soluble oxides include oxides of Group IIA elements that have a solubility constant between 5 and 25. Preferably, solubility constants between 5 and 12 are desired, and magnesium oxide (MgO); Barium oxide (BaO); and Calcium oxide (CaO) are the most preferred oxides for reacting with the monovalent alkali metals to form ceramicrete binders. Zinc oxide (ZnO) of group IIB elements may also be used.

Sparsely soluble silicates suitable for forming the phospho-silicate ceramics of the present invention include silicates of Group IIA and IA elements that have a solubility constant between 5 and 25. Once again silicates with a solubility constant between 5–12 are more preferred and silicates such as calcium silicate ($CaSiO_3$); talc or magnesium silicate ($MgSiO_3$) barium silicate ($BaSiO_3$); sodium silicate ($NaSiO_3$); lithium silicate ($LiSiO_3$); and serpentinite ($Mg_6Si_4O_{10}(OH)_8$) are preferred. Calcium silicate has a solubility product constant of approximately 8, which is similar to magnesium oxide, and thus would be a compatible material with the ceramicrete binder, and the most preferred sparsely soluble silicate for forming the phospho-silicate ceramics of the present invention. Calcium silicate, or Wollastonite as it is known in its mineral form, is an inexpensive product, typically 5–10 cents per pound, and is widely available in large amounts. Wollastonite is also available in powder form, is not toxic, and is thus easy to handle and transport. Wollastonite as referred to in the present patent application is defined according to Dana's Manual of Mineralogy, Revised by Cornells Klein and Cornelius S. Hurlbut, Jr. 20$^{th}$ ed, pub. John Wiley and Sons, New York (1977) pp. 406–408.

The addition of Wollastonite to the ceramicrete binders produced exciting and unexpected results, as the Wollastonite unexpectedly modified the ceramicrete binders significantly. The Wollastonite crystals greatly increased the fracture toughness of the ceramicrete matrix, and amorphous silicate released from the Wollastonite in solution, greatly increased the compression and flexural strength of the matrix while at the same time reducing its porosity and permeability to water.

Individual Wollastonite crystals are acicular or elongated in structure, and when combined within the ceramicrete matrix, the Wollastonite crystals act as whiskers to resist crack propagation. The Wollastonite crystals either stop or divert propagating cracks requiring more energy for the crack to continue, and thus increasing the fracture toughness of the resulting product. Wollastonite also increases the viscosity of the mixture, and overall strength of the resulting phospho-silicate ceramic.

Amorphous silica released from Wollastonite in an aqueous solution chemically reacts with the phosphates of the ceramicrete binder to form a glassy phase within the ceramicrete matrix. This chemical reaction was completely unexpected because typically silicates and silicas, i.e. sand, are stable materials. Silicates and silicas, even do not dissolve in acidic solutions and do not react in an aqueous environment. However, it was observed that the addition of a sparsely soluble silicate such as Wollastonite to phosphate ceramicrete binders provided the very unexpected chemical reactions as outlined below.

Sparsely soluble silicates such as Wollastonite, talc, and serpentinite are slightly alkaline and when combined with water they become ionized, releasing the metal cations. For example, Wollastonite dissolved in acidic water such as solutions of $H_3PO_4$, $KH_2PO_4$, $Al(H_2PO_4)_3$ etc., released cations $Ca^{++}$ and silicate $SiO_3^{--}$. The calcium cations reacted with the phosphates to form calcium phosphates. The silicate anion formed metasilicic acid ($H_2SiO_3$) which further reacted with available cations to form $K_2SiO_3$ as seen in equation 5.

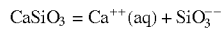 Equation 1

 Equation 2

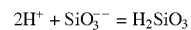 Equation 3

 Equation 4

 Equation 5

The first and third equations demonstrate that the addition of a sparsely soluble silicate such as calcium silicate is a good method for introducing metasilicic acid to a phosphate slurry. The acid reacts subsequently with other available cations, such as $2K^+$ as shown in equation 5 to form silicate glass. For example, if sodium dihydrogen phosphate or potassium dihydrogen phosphate was used instead of phosphoric acid water as the provider of phosphate anions, the metasilicic acid will react with either $Na^+$ or $K^+$ ions to form alkali metal glass. This alkali metal glass formed within the phospho-silicate ceramic of the present invention is believed to fill the voids between particles of the ceramic and produce a dense solidified non-porous ceramic product. Additionally, the glassy phase within the ceramic product is also believed to bind particles of the product together to produce a hard ceramic, thus increasing both the compression and flexural strength of the resulting product.

After the chemical reaction between the silicate and the ceramicrete binder, at least three products are produced, namely, magnesium potassium phosphate binder ($MgKPO_4 \cdot 6H_2O$), calcium hydrophosphate ($CaHPO_4 \cdot 2H_2O$), and potassium silicate ($K_2SiO_3$). The magnesium potassium phosphate provides the bulk strength for the new phospho-silicate ceramic, and the potassium silicate produces a glassy phase that fills the voids between the bulk compounds, resulting in a product that is almost completely dense. This glassy phase provides the benefits of reducing or even eliminating the porosity of the resulting ceramic and smoothing its surface.

The compounds of the phospho-silicate ceramic of the present invention are not as acidic as phosphate cement, nor as alkaline as Portland cement. The compounds are more neutral, less corrosive, and weather better over time. However, similar to Portland cement, the phospho-silicate ceramic of the present invention can be easily made on site by just adding water to a blend of powders. Thus, current construction equipment can be easily used, without extensive modifications, to make the phospho-silicate ceramic of the present invention on a construction site.

The phospho-silicate ceramic of the present invention is manufactured through a unique but relatively simple process of combining a monovalent alkali metal phosphate powder and a sparsely soluble oxide powder, with the sparsely soluble silicate powder in an aqueous solution. The powders are simply blended together. The sparsely soluble silicate powder comprises 1–80% of the powder mixture and preferably 50–60% of the powder mixture by weight. The monovalent alkali metal phosphate and the sparsely soluble oxide powder are combined in the molar ratio range of (0.5–1.5):1 in the widest range, (0.8–1.2):1 in a preferred range, and 1:1 in the most preferred ratio range. Alternatively, an ammonium hydrogen phosphate powder, aluminum hydrophosphate powder or phosphoric acid solution can replace the monovalent alkali metal phosphate powder in the same concentration.

Water is then stirred into the powder blend to form a slurry. A suitable water to powder weight ratio is (1–1.5):2 in the widest range, (1–1.2): 2 in a preferred range and 1:2 in the most preferred range. The slurry is stirred for 10 to 25 minutes at room temperature and left to harden, or alternatively, poured into molds and left to harden. The ceramic material will harden within two hours, and then continue to cure for at least 3 weeks.

Coloring the phospho-silicate ceramic of the present invention can also be achieved by simply adding an inorganic powder pigment to the powder blend before the water is added. Since Wollastonite crystals are white, the phospho-silicate ceramic of the present invention can easily be colored to any desired shade or hue. This attribute can be particularly useful in the construction industry where colored binding materials can provide substantial cost savings and provide great architectural freedom and creativity in designing structures utilizing binding materials of various color schemes.

EXAMPLE 1

In a preferred method, 60% by weight Wollastonite powder, 10% by weight magnesium oxide powder, and 30% by weight potassium dihydrogen phosphate powder were combined to form a powder blend. Water was added to the powder blend in a weight ratio of 1:5 respectively, and stirred for 15–25 minutes at room temperature to form a slurry. The slurry was then poured into plastic syringes of one inch diameter and filled to a volume of 60 cc's and left to cure. The slurry set into a hard ceramic within two hours. The resulting chemically bonded phospho-silicate ceramic was dense, non-porous and homogenous.

EXAMPLE 2

In another embodiment of the invention, 12.5% by weight magnesium oxide powder, 37.5% by weight potassium dihydrogen phosphate powder, and 50% by weight Wollastonite power was mixed to form a powder blend. Water was added to the powder blend in a weight ratio of 1:4 respectively, and stirred for 15–25 minutes at room temperature to form a slurry. The slurry was then poured into plastic syringes having a one inch diameter and filled to a volume of 60 cc's, and left to cure. The slurry set into a hard ceramic within two hours. The resulting chemically bonded phospho-silicate ceramic was dense, non-porous and homogenous.

The following Table compares the mechanical properties of Examples 1 and 2, with a phospho-silicate ceramic/sand sample, a ceramicrete binder sample, a ceramicrete/ash sample, and high strength concrete.

As shown in Table 1 above, the phospho-silicate ceramic of Examples 1 and 2 have a flexural strength far superior to the flexural strength of high strength concrete and ceramicrete binder. The phospho-silicate ceramics of Examples 1 and 2 had a flexural strength 30–50% higher than the flexural strength of high strength concrete. The phospho-silicate ceramics of Examples 1 and 2 have a flexural strength 20–40% greater than the flexural strength of ceramicrete binder. Additionally, as shown in Table 1, the phospho-silicate ceramics of Examples 1 and 2 have a compression strength two times the compression strength of ceramicrete binder.

Table 1 also compares the fracture toughness of the phospho-silicate ceramics of Examples 1 and 2, with the ceramicrete binder/ash product. The MPa.√m fracture toughness values for phospho-silicate ceramic Examples 1 and 2 are 0.66 and 0.63 respectively, and the fracture toughness value for ceramicrete binder/ash is 0.19. Both phospho-silicate ceramic Examples 1 and 2 exhibit a fracture toughness 3 times greater than the fracture toughness of the ceramicrete/ash product. This result further supports Applicant's theory that the acicular or elongated crystals of Wollastenite act as whiskers to resist crack propagation and thus increase the overall fracture toughness of the resulting product. Ash does not contain elongated crystal structures, and as a result, ash is poor in resisting crack propagation and increasing the overall fracture toughness of the resulting product.

TABLE 1

| Composition (wt. %) | | | Cure Time | Strengths (psi) | | Fracture Toughness | Water Absorption |
|---|---|---|---|---|---|---|---|
| Binder* | Wollastonite | Other | Days | Compres | Flexural | MPa. √ m | Wt. % |
| 40 | 60 | Nil | 21 | 8,426 | 1,474 | 0.66 | 2 |
| 50 | 50 | Nil | 14 | 7,755 | 1,236 | 0.63 | 2 |
| 30 | 30 | Sand 40 | 11 | 6,264 | 1,255 | 0.63 | 3.0 |
| 100 | Nil | Nil | 21 | ≈3,500 | ≈1,100 | n/a | ~15 |
| 40 | Nil | Ash 60 | 14 | 11,507 | 1,474 | 0.19 | 1.78 |
| High Strength concentrate (literature value) | | | 28 | 8,000 | 940 | n/a | ≈10–20 |

*Binder is defined as the mixture of potassium dihydrogen phosphate (monopotassium phosphate) and magnesium oxide.

As shown in Table 1, the phospho-silicate ceramics of Examples 1 and 2 have a low water absorption, and thus reduced porosity, compared to high strength concrete and ceramicrete binder. The weight percent water absorption of the phospho-silicate ceramics of Examples 1 and 2 is ⅕–1/10 the weight percent water absorption of high strength concrete, and ½–1/8 the weight percent water absorption of ceramicrete binder. It appears that the addition of Wollastonite to the ceramicrete binder reduced the porosity of the resulting phospho-silicate ceramic by a significant margin, thus resulting in a much denser end product. Typically, water absorption is a direct indication of the porosity of a material, however, in the phospho-silicate ceramics as shown in Examples 1 and 2, it is believed that at least some of the water absorption is due to the formation of hydroxides of magnesium and calcium rather than due to the porosity of the ceramic. The actual porosity of the phospho-silicate ceramic of the present invention is believed to be less than that indicated by the water absorption test in Table 1. As a result, it is expected that the phospho-silicate ceramics of the present invention would not experience freeze/thaw deterioration during the temperature fluctuations experienced in cold climates because the phospho-silicate ceramics of the present invention appear fully dense.

The X-ray diffraction pattern of the phospho-silicate ceramic of Example 1 shown in FIG. 1 exhibited a broad hump in the center of the pattern. This broad hump is believed to be due to the formation of potassium silicate glass ($K_2SiO_3$) formed by the chemical reaction between potassium cations and metasilic acid, as shown in equation 5 above. It is believed that this glassy phase fills in the voids and pores in the resulting ceramic of the present invention, and is important for both reducing the open porosity of the ceramic of the present invention, which appears very dense and has a smooth surface, and for increasing the compression and flexural strength of the ceramic of the present invention.

Also shown in the X-ray diffraction analysis, are major peaks that were identified as unreacted calcium silicate, magnesium potassium phosphate binder ($MgKPO_4.6H_2O$) and calcium hydrophosphate ($CaHPO_4.2H_2O$). Calcium hydrophosphate is likely to be absorbed into the human body and can regenerate body tissues when the phospho-silicate ceramic of the present invention is used in bio-materials. For this reason, the phospho-silicate ceramic of the present invention may be one of the most suitable materials for bio-material purposes such as orthopedic and dental applications.

Figure 2:
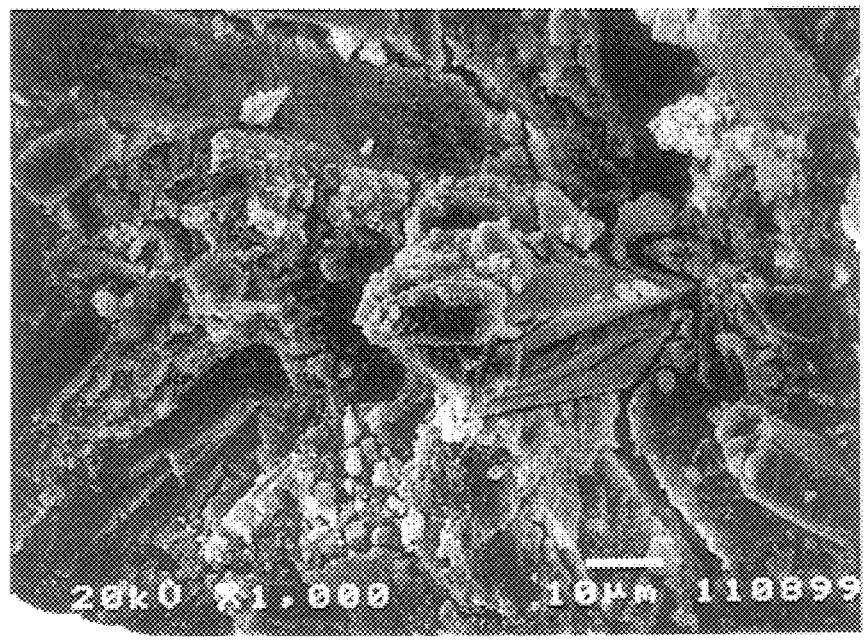
FIG. 2 is a scanning electron microphotograph of a phospho-silicate ceramic sample.

A scanning electron micrograph of fracture surface of samples of the phospho-silicate ceramic of the present invention is shown in FIG. 2. The micrograph shows the crack propagation of the ceramic is intergranular, with the cracks running around the elongated crystals of the Wollastonite. Such crack deflection by the Wollastonite crystals increases the fracture energy and improves the fracture toughness of the phospho-silicate ceramic of the present invention.

In another embodiment, the phospho-silicate ceramic of the present invention can be sold as separate components grouped into kits for forming phospho-silicate ceramic structures for home as well as industrial use. For example, a typical kit would include a bag or drum, depending on the volume needed, of suitable monovalent alkali metal phosphate powder, suitable sparsely soluble oxide, and suitable sparsely soluble silicate. Each powder is combined in an appropriate amount as described above. The kit could also include an optional bag or drum of inorganic pigment powder to dye the final product to a desired color, or a bag or drum of an aggregate, such as granite, if a particular texture is desired in the final product. Easy to follow instructions would direct the user to combine the powders, add the appropriate amount of water to form a slurry, and add any desired aggregate. The slurry is then poured into a mold, for example a countertop mold for home use, and allowed to set and cure.

Alternatively, the phospho-silicate ceramic can be sprayed onto the surface of a structure for fireproofing, water proofing, etc. The phospho-silicate ceramic will chemically bond to the substrate, making this product far superior to a laminate applied with an adhesive to a substrate.

Other ways of making Wollastonite containing phospho-silicate ceramics include reacting Wollastonite with phosphoric acid solution, or aluminum hydro phosphate solution, but a small amount of boric acid needs to be added as a retardant because phosphoric acid is too reactive. It is also possible to neutralize the phosphoric add with hydroxides or carbonates of an alkali metal such as sodium or potassium, and react it with Wollastonite.

EXAMPLE 3

1. 40 g of Wollastonite, and 67 g of 50 wt. % concentrated phosphoric acid solution neutralized with 15% of sodium carbonate were reacted for 20 min. The slurry warmed up and set into a hard ceramic. We believe, sodium carbonate reacted with phosphoric acid solution to form sodium dihydrogen phosphate which reacted with Wollastonite to form the ceramic. The ceramic contained some glassy phase, probably sodium phosphate and sodium silicate, unreacted Wollastonite, and calcium hydrophosphate.

2. 40 g of Wollastonite, 67 g of 50% concentrated phosphoric acid solution when mixed together reacted instantaneously and formed a precipitate. With addition of 3 g of boric acid, however, the slurry set into a hard ceramic. Thus, it is possible to produce ceramics of Wollastonite without neutralizing phosphoric acid or adding magnesium oxide as done in the previous case studies. The product contained calcium hydrophosphate and unreacted Wollastonite.

3. 80 g of Wollastonite, 100 g of 50% concentrated phosphoric acid solution and 15 g of potassium carbonate were mixed for 10 min. Initial setting was in one hour and complete setting was in 3 days.

4. 100 g of Wollastonite was mixed with 100 g of sodium dihydrogen phosphate and 100 g of water. The slurry was mixed for 30 min. It warmed up and set in two days.

5. 25 g of Wollastonite, 50 g of sodium dihydrogen phosphate, 112.5 g of ash and 80 g of water were mixed for 10 min. The slurry set in two days. The set product contained unidentifiable glassy phase.

All these tests demonstrate that phosphates may be added in different forms to produce Wollastonite containing chemically bonded phospho-silicate ceramics.

The foregoing description has been provided to clearly define and completely describe the present invention. Various modifications may be made without departing from the scope and spirit of the invention which is defined in the following claims.

What is claimed is:

1. A chemically bonded ceramic, comprising:
phospho-silicate formed by chemically reacting a monovalent alkali metal phosphate in powder form and a sparsely soluble oxide with a sparsely soluble silicate in an aqueous solution.

2. The ceramic according to claim 1, wherein said monovalent alkali metal phosphate is selected from the group consisting of $NaH_2PO_4$, $LiH_2PO_4$, and $KH_2PO_4$.

3. The ceramic according to claim 1, wherein said sparsely soluble oxide has a solubility constant between 5 and 25.

4. The ceramic according to claim 2, wherein said sparsely soluble oxide is selected from the group consisting of MgO, BaO, ZnO, and CaO.

5. The ceramic according to claim 1, wherein said sparsely soluble silicate has a solubility constant between 5 and 25.

6. The ceramic according to claim 4, wherein said sparsely soluble silicate is selected from the group consisting of $CaSiO_3$, $MgSiO_3$, $BaSiO_3$, $Na_2SiO_3$, $Li_2SiO_3$, and $Mg_6Si_4O_{10}(OH_8)$.

7. The phospho-silicate ceramic according to claim 1, wherein said monovalent alkali metal phosphate, said sparsely soluble oxide and said sparsely soluble silicate are all in powder form and combined to form a mixture, said silicate comprises between 50–60% by weight of said mixture.

8. The ceramic according to claim 1, wherein said monovalent alkali metal phosphate, said sparsely soluble oxide and said sparsely soluble silicate are all in powder form and combined to form a mixture, said mixture is comprised of 30% by weight monovalent alkali metal phosphate, 10% by weight sparsely soluble oxide and 60% by weight sparsely soluble silicate.

9. The ceramic according to claim 1, wherein said monovalent alkali metal phosphate, said sparsely soluble oxide and said sparsely soluble silicate are all in powder form, and said monovalent alkali metal phosphate powder, in a range of 45–15 weight % is chemically reacted with said sparsely soluble oxide powder in a range of 5–15 weight % and said sparsely soluble silicate powder in a range of 30–80 weight %.

10. A chemically bonded ceramic, comprising:
phospho-silicate formed by chemically reacting an ammonium phosphate in powder form and a sparsely soluble oxide with a sparsely soluble silicate in an aqueous solution.

11. The ceramic according to claim 10, wherein said ammonium phosphate is selected from the group consisting of $(NH_4)H_2PO_4$ and $(NH_4)_2HPO_4$.

12. The ceramic according to claim 10, wherein said sparsely soluble oxide has a solubility constant between 5 and 25.

13. The ceramic according to claim 10, wherein said sparsely soluble silicate has a solubility constant between 5 and 25.

14. The phospho-silicate ceramic according to claim 10, wherein said ammonium phosphate, said sparsely soluble oxide and said sparsely soluble silicate are all in powder form and combined to form a mixture, said silicate comprises between 50–60% by weight of said mixture.

15. The ceramic according to claim 10, wherein said ammonium phosphate, said sparsely soluble oxide and said sparsely soluble silicate are all in powder form and combined to form a mixture, said mixture is comprised of 30% by weight ammonium phosphate, 10% by weight sparsely soluble oxide and 60% by weight sparsely soluble silicate.

16. A chemically bonded ceramic, comprising:

calcium phosphate by chemically reacting a monovalent alkali metal phosphate as described in claim 1, and sparsely soluble calcium silicate such as Wollastonite in an aqueous solution.

17. A ceramic according to claim 16, wherein, the chemical reactions form a glassy phase within the ceramicrete matrix.

18. The ceramic according to claim 1, wherein calcium phosphates are formed.

19. The ceramic according to claim 1, wherein a glassy phase is formed.

20. The ceramic according to claim 1, wherein an alkali metal glass is formed.

21. The ceramic according to claim 1, wherein a silicate glass is formed.

22. The ceramic according to claim 1, further including an inorganic pigment.

23. The ceramic according to claim 1, further including an aggregate.

24. The ceramic according to claim 10, further including an inorganic pigment.

25. The ceramic according to claim 10, further including an aggregate.

26. A phospho-silicate ceramic, comprising:

Potassium silicate formed by chemically reacting a binder compound and a sparsely soluble silicate in an aqueous solution, the binder compound selected from the group consisting of magnesium potassium phosphate and newberyite ceramics.

* * * * *